United States Patent [19]

Broom

[11] 4,226,530
[45] Oct. 7, 1980

[54] METHOD AND DEVICE FOR INDICATING HEADLIGHT ALIGNMENT

[76] Inventor: Gilbert R. Broom, 11 Willow La., Schererville, Ind. 46375

[21] Appl. No.: 949,653

[22] Filed: Oct. 10, 1978

[51] Int. Cl.³ .............................................. G01J 1/00
[52] U.S. Cl. ...................................... 356/121; 33/288
[58] Field of Search ................. 356/121, 247; 33/288, 33/228, 264, 335, 297, 286–287

[56] References Cited

U.S. PATENT DOCUMENTS

| 2,464,521 | 3/1949 | McCall | 33/297 |
| 2,913,824 | 11/1959 | Drennan | 33/288 |
| 2,940,174 | 6/1960 | Shoemaker | 356/121 |
| 2,958,134 | 11/1960 | Wilkerson | 33/288 |
| 3,520,618 | 7/1970 | Bentley | 356/121 |

FOREIGN PATENT DOCUMENTS 535330  4/1941  United Kingdom ................. 33/203.15

OTHER PUBLICATIONS

SAE Recommended Practice, "Headlamp Testing Machines-SAE J600a," 1978.
SAE Standard, "Headlamp Aiming Device for Mechanically Aimable Sealed Beam Headlamp Units-SAE J602c," 1978.
SAE Standard, "Lighting Inspection Code-SAE J599d," 1978.

Primary Examiner—John K. Corbin
Assistant Examiner—Wm. H. Punter
Attorney, Agent, or Firm—Woodard, Weikart, Emhardt & Naughton

[57] ABSTRACT

A method and device for indicating alignment of a pair of headlights. A pair of elongated members are removably mounted by suction cups to the forward-looking faces of a pair of headlights. Each elongated member includes a sight-line scope which is used to visually observe a lateral aim mark on the elongated member mounted to the opposite headlight. The vertical aim of each headlight is adjusted until the bubble levels on the members are properly centered. The lateral aim of each headlight is adjusted until the lateral aim mark on one elongated member is properly centered relative to the sight-line scope provided on the opposite elongated member.

2 Claims, 11 Drawing Figures

METHOD AND DEVICE FOR INDICATING HEADLIGHT ALIGNMENT

BACKGROUND OF THE INVENTION

This invention is in the field of methods and devices for aligning automobile headlights. Methods and devices have heretofore been provided for facilitating the proper alignment of automobile headlights. Likewise, various standards have been devised by the automotive industry to insure proper headlight alignment. For example, the Society of Automotive Engineers (SAE) annually publishes in the SAE Handbook various recommendations and standards concerning headlight alignment. Traditionally, headlights have been aligned by directing the lights toward a headlight aiming screen or wall chart which include a plurality of horizontal and vertical tapes spaced apart and arranged so as to correctly define vertical and lateral aiming areas upon which the headlight beams should fall within, assuming the headlights are properly aligned and the vehicle is located correctly relative to the screen or chart. Many such screens may be found in the neighborhood service stations and automotive repair shops. A headlight aiming screen or wall chart is shown in SAE Recommended Practice, Lighting Inspection Code—SAE J599 contained in the 1978 SAE handbook.

A more sophisticated type of alignment device is available and attaches directly atop the aiming pads of the headlights. The aiming pads typically project forwardly of the forward-looking face of the headlight. These devices typically are more expensive and complicated to operate as compared to the wall chart previously discussed. Additional SAE practices or standards relative to headlight alignment include Headlamp Testing Machines SAE J600a and Headlamp Aiming Device for Mechanically Aimable Sealed Beam Headlamp Units SAE J602c, both of which are contained in the 1978 edition of the SAE handbook.

Automobiles frequently encounter rough terrain such as railroad tracks and chuckholes and as a result, the headlights do not remain in an aligned condition. Misaligned headlights provide for a very dangerous condition during operation of the automobile during night or in poor environmental conditions, including rain, snow or fog. Thus, it is extremely desirable to realign the headlights whenever required. Nevertheless, many automobile owners do not periodically have someone properly align the automobile headlights. The expense and time involved is a deterrent to constantly maintaining proper headlight alignment. There is a need for a method and device for allowing the automobile owner to personally align the headlights without requiring purchase of expensive devices and without requiring the automobile to be taken into the automobile dealer or service station. Disclosed herein is such a method and device.

SUMMARY OF THE INVENTION

One embodiment of the present invention is a device for indicating alignment of a pair of headlights with forward-looking faces comprising a first elongated member mountable cantileveredly to the forward-looking face of one headlight of a pair of headlights, a second elongated member mountable cantileveredly to the forward-looking face of the other headlight of the pair of headlights, mounting means operable to mount the first elongated member and the second elongated member to the forward-looking faces of the pair of headlights, headlight vertical aim indicating means cooperatively associated with the first elongated member and the second elongated member being operable to indicate presence of the first elongated member in a horizontal plane and presence of the second elongated member in a horizontal plane and first headlight lateral aim indicating means on the first elongated member and cooperatively associated with the elongated member being operable to indicate lateral alignment of the second elongated member relative to the first elongated member.

Another embodiment of the present invention is a method of aligning a pair of automobile headlights comprising the steps of mounting one end of a first elongated member to the forward-looking face of one headlight of a pair of headlights with the opposite end of the member having a sight-line scope thereon, mounting one end of a second elongated member to the forward-looking face of the other headlight of the pair of headlights with the opposite end of the second member having a lateral aim mark thereon, looking through the scope toward the second elongated member, adjusting the lateral aim of the headlights until the mark is visually observed through the scope in a specified area and adjusting the vertical aim of the headlights until the first elongated member and the second elongated member extend horizontally.

Yet another embodiment of the present invention is a device for use in aligning a headlight comprising an elongated main body with a proximal end and an opposite distal end portion and a longitudinal axis extending therebetween, the main body includes a sight-line aperture and a lateral aim mark at the distal end portion, a suction cup on the proximal end to mount the main body on the forward-looking face of a headlight to be aligned and means on the main body to indicate when the axis of the main body extends horizontally from the suction cup.

It is an object of the present invention to provide a new and improved device for indicating alignment of a pair of headlights.

Another object of the present invention is to provide a new and improved method for aligning a pair of headlights.

Related objects and advantages of the present invention will be apparent from the following description.

DESCRIPTION OF THE PREFERRED EMBODIMENTS

Figure 1:
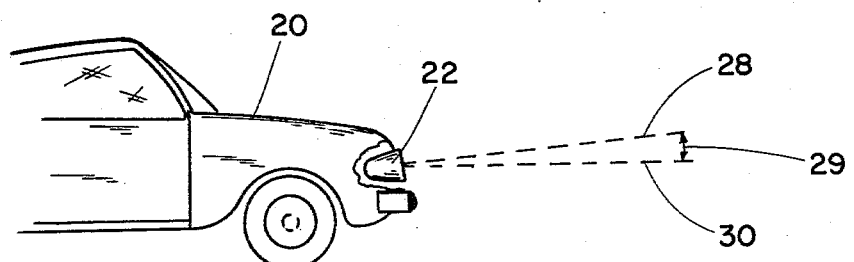
FIG. 1 is a fragmentary schematic side view of an automobile depicting the vertical aim of the headlights.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
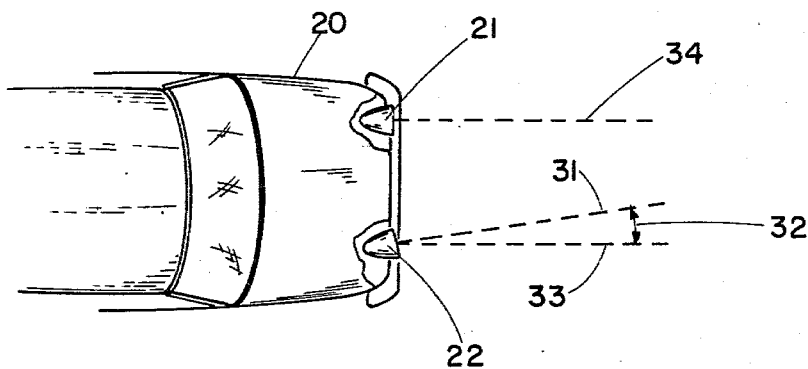
FIG. 2 is a fragmentary top schematic view of an automobile depicting lateral aim of the headlights.
Figure 10:
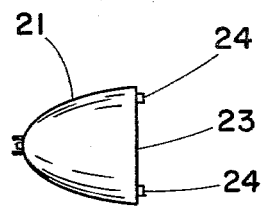
FIG. 10 is a side view of a sealed beam headlight having a flat forward-looking face.
Figure 11:
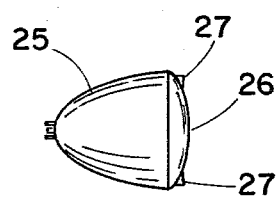
FIG. 11 is a side view of a sealed beam headlight having a rounded or convex configured forward-looking face.

Referring now more particularly to FIGS. 1 and 2, there is shown the front portion of an automobile 20 having a pair of headlights 21 and 22 both of which include a flat forward-looking face. A side view of headlight 21 is shown in FIG. 10. Headlight 21 is a mechanically aimable sealed beam unit having a flat forward-looking face 23 with a plurality of aiming pads 24 projecting outwardly therefrom. The older, more traditional embodiment of the sealed beam headlight is shown in FIG. 11 with headlight 25 having a radius or convex configured forward-looking face 26 also including a plurality of aiming pads 27 projecting outwardly therefrom.

Headlight 22 is shown in FIG. 1 as being vertically misaligned with the direction of vertical aim shown by the dashed line 28 oriented at angle 29 relative to horizontal 30. In addition, headlight 22 is laterally misaligned with the lateral aim represented by dashed line 31 (FIG. 2) which is shown as misaligned to the left at angle 32 relative to the forward direction 33 of travel. Headlight 21 is shown in FIG. 2 as having a lateral aim 34 parallel to the direction of travel 33 and therefore laterally aligned.

Figure 3:
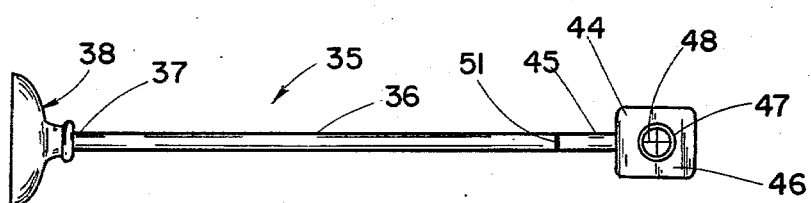
FIG. 3 is a side view of a typical embodiment of a device for indicating headlight alignment incorporating the present invention.
Figure 6:
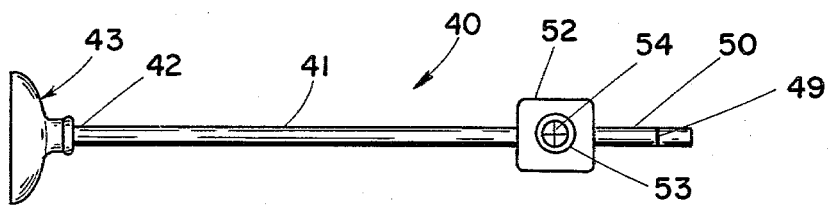
FIG. 6 is the same view as FIG. 3 only showing a different positioning of the sight-line scope and lateral aim mark.

The device for indicating alignment of the pair of headlights shown in FIGS. 1 and 2 includes the two elongated members shown in FIGS. 3 and 6. The device shown in FIG. 3 is mounted to one headlight whereas the device shown in FIG. 6 is mounted to the remaining headlight. Device 35 includes a first elongated member 36 which may be configured as a rod with a first end 37 attached to a conventional suction cup 38. Suction cup 38 is operable to mount device 35 cantileveredly to the forward-looking face 23 (FIG. 10) of the headlight. Likewise, device 40 (FIG. 6) has an elongated member 41 with a rod-like configuration and a first end 42 attached to a conventional suction cup 43 operable to removably mount in cantilevered fashion to the forward-looking face of the other headlight of the pair of headlights. Various devices including suction cups are mentioned in SAE Standard J602c for retaining an alignment device to a headlight unit.

A headlight lateral aim indicating means 44 is mounted to the distal end portion 45 opposite of end 37. Means 44 includes a main body 46 with a sight-line scope 47 extending therethrough. Scope 47 is of tubular construction and projects through the opposite sides of main body 46. Scope 47 is hollow and has a pair of intersecting sight-line cross hairs 48 mounted therein thereby allowing a person to look through scope 47 and sight a distant object relative to cross hairs 48.

A lateral aim mark 49 is provided on distal end portion 50 of device 40 (FIG. 6). Lateral aim mark 49 may include projections, ridges or simply a painted line on device 40 which is clearly visible from a distance. Lateral aim mark 49 is spaced from suction cup 43 a distance equal to the spacing of the intersecting cross hairs 48 from suction cup 38. Thus, lateral aim mark 49 may be visually observed through scope 47 when suction cups 38 and 43 are mounted to the same planar surface.

Device 35 is provided with a lateral aim mark 51 identical to lateral aim mark 49 with the exception that mark 51 is spaced between suction cup 38 and scope 47. Likewise, device 40 is provided with a headlight lateral aim indicating means 52 identical to means 44 with the exception that the lateral aim means 52 is spaced between lateral aim mark 49 and suction cup 43. Means 52 includes a scope 53 identical to scope 47 and has a pair of intersecting cross hairs 54 spaced from suction cup 43 a distance equal to the spacing between suction cup 38 and lateral aim mark 51. Thus, lateral aim mark 51 may be visually observed through scope 53 with suction cups 38 and 43 mounted to the same planar surface. Headlight lateral aim indicating means 52 is therefore cooperatively associated with the lateral aim mark 51 to indicate alignment of the elongated member 36 relative to the elongated member 41 whereas means 44 is cooperatively associated with lateral aim mark 49 to indicate alignment of elongated member 41 relative to elongated member 36.

Figure 4:
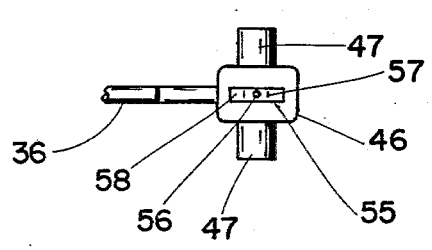
FIG. 4 is a fragmentary top view of the device of FIG. 3.
Figure 5:
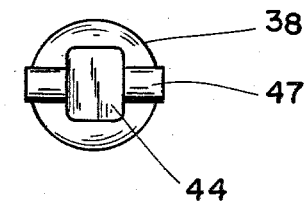
FIG. 5 is an end view of the device of FIG. 3.

The main body of each means 44 and 52 is provided with a bubble level for indicating whether the elongated members 36 and 41 extend horizontally. For example, bubble level 55 is mounted to the top wall of main body 46 of means 44 (FIG. 4). Level 55 is conventional in construction and includes a tubular main body filled with a liquid sufficient to form bubble 56 when positioned between centering lines 57 and 58 indicate that the elongated member 36 extends horizontally. Likewise, a bubble level is provided in the top wall of means 52 for indicating whether elongated member 41 extends horizontally. The bubble levels in each device 35 and 40 provide a headlight vertical aim indicating means which is cooperatively associated with the elongated members so as to indicate the presence of the elongated members in a horizontal plane.

Figure 7:
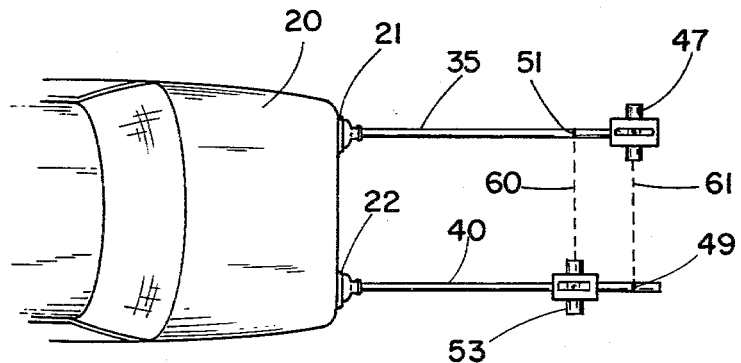
FIG. 7 is a fragmentary top view of an automobile with the devices of FIGS. 3 and 6 shown mounted to the headlights.

The method of aligning a pair of automobile headlights 21 and 22 (FIG. 7) includes the first step of mounting one end of device 35 to the forward-looking face of headlight 21. In the embodiment shown in FIG. 3, device 35 is mounted by suction to headlight 21. In addition, device 40 is mounted via a suction cup to the forward-looking face of headlight 22. Headlights 21 and 22 are shown in FIG. 7 as being laterally aligned and thus, lateral aim mark 51 may be observed through scope 53 as shown by dashed line 60 whereas lateral aim mark 49 may be observed through scope 47 as indicated by dashed line 61. In the event headlights 21 and 22 are not laterally aimed, then the headlights may be aligned by looking through scope 47 toward device 40 while the lateral aim of headlights 21 and 22 are adjusted until the lateral aim mark 49 is visible through scope 47. In order to increase the accuracy of alignment, lateral aim mark 51 may be then observed through scope 53 with any fine lateral aim adjustment to headlights 21 and 22 then being accomplished until the lateral aim mark is properly centered relative to the intersecting cross hairs within scope 53. This procedure may then be repeated by first looking through one scope and adjusting the lateral aim and then looking through the other scope and adjusting the lateral aim until both lateral aim marks are properly centered relative to the cross hairs of the opposite sight-line scope thereby achieving lateral aim of the headlights. Conventional headlights on automobiles are provided with externally accessible adjustment screws which may be turned in order to adjust the lateral aim. Additional adjustment screws are provided in order to adjust the vertical aim.

In order to properly vertically align headlights 21 and 22, the vertical adjustment screws on the headlights should be turned until the bubbles are properly centered in the bubble levels provided on means 44 and 52.

Best results are obtained in aligning the headlights by mounting devices 35 and 40 centrally on the forward-looking face of each headlight. The suction cups are shown as enlarged relative to the headlights in FIG. 7 for purposes of clarity. Actually, the cups are small compared to the headlights. In the more modern type of headlight shown in FIG. 10 which has a flat forward-looking face 23, the suction cups of each device 35 and 40 should be secured thereto in an appropriate area on face 23 so as to allow for the visual observation through the sight-line scopes of the opposite elongated member. In the more traditional headlight shown in FIG. 11 having a rounded forward-looking face 26, it is particularly necessary to locate the suction cups of devices 35 and 40 in the exact center of the forward-looking face due to the rounded curvature of the face.

Figure 8:
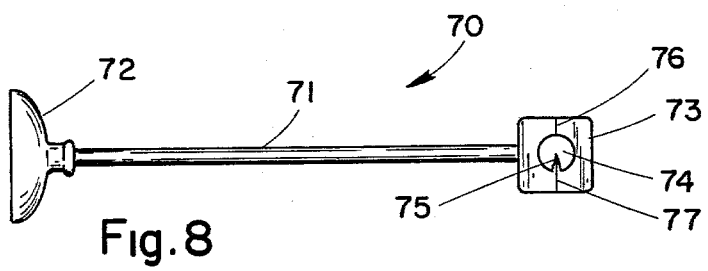
FIG. 8 is a side view of another embodiment of the device of FIG. 3.
Figure 9:
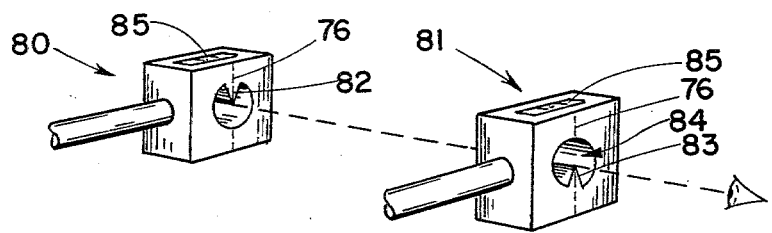
FIG. 9 is a fragmentary perspective view of two of the alignment devices of FIG. 8 showing the lateral aiming and alignment step.

Many variations in the disclosed device are contemplated and included in the present invention. Another embodiment of the device is shown in FIGS. 8 and 9 and is identical to the devices shown in FIGS. 3 and 6 with the exception that the lateral aim mark is incorporated into the scope so as to require manufacture of only a single device as compared to the two separate devices shown in FIGS. 3 and 6. Device 70 includes a rod-like member 71 having one end secured to the forward-looking face of the headlight by a suction cup 72 and with a block-like body 73 attached to the opposite end of rod 71. Body 73 includes a sight-line aperture 74 extending therethrough with a projection or ridge 75 projecting radially into passage 74. Aim marks 76 and 77 are provided on the opposite sides of main body 73 and are aligned with projection 75.

The method of aligning a pair of automobile headlights includes as previously described the steps of mounting one each of the devices 70 to the forward-looking face of each headlight of a pair of headlights. A fragmentary view of two such devices 70 are shown in FIG. 9 as devices 80 and 81 mounted to a pair of headlights with the headlights not being shown in the drawing. Devices 80 and 81 are identical to device 70. It will be noted, however, that device 80 is rotated 180° so that ridge or projection 82 which is identical to projection 75 projects radially downward into the sight-line aperture whereas ridge 83 of device 81 projects radially upward into the sight-line aperture. An observer may then look through sight-line aperture 84 toward device 80. The lateral aim of the headlights is then adjusted until ridges 82 and 83 are observed to be vertically aligned. Line 76 assists the observer in observing the alignment of ridges 82 and 83. Likewise, the vertical aim of the headlights is adjusted until the bubbles are appropriately centered in the bubble levels provided in each device 80 and 81. A bubble level is provided both in the top surface and the bottom surface of each device 80 and 81 in order that manufacture of a device may be simplified and that only a single version of the device be manufactured by allowing visual observation of the sight-line bubble, regardless of whether the device is turned so as to allow the projection 82 to point downwardly or projection 83 to point upwardly. The bubble level is shown in FIG. 9 as level 85 and is identical to the level previously described and shown for devices 35 and 40.

Each device 35, 40 and 70 includes a longitudinal axis which extends through the elongated member from one end of the member to the opposite end of the member. The bubble levels will indicate when the longitudinal axis of the elongated member extends horizontally from the forward face of the headlight thereby indicating when the headlight is vertically aligned. In addition, the sight-line aperture or scope is perpendicularly arranged relative to the longitudinal axis thereby allowing for observation and adjustment of the lateral aim of the headlights.

It will be obvious from the above description that the above invention provides a relatively inexpensive and quick method for allowing a person to align automobile headlights. It will also be obvious that the present invention provides a device which may be easily manufactured, sold and used by the automobile operator to align the automobile headlights without requiring such alignment to be accomplished at an automobile dealer or service station.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A device for indicating alignment of a pair of headlights each with a forward-looking face comprising:
   a first elongated member mountable cantileveredly to the forward-looking face of one headlight of a pair of headlights;
   a second elongated member mountable cantileveredly to the forward-looking face of the other headlight of said pair of headlights;
   mounting means operable to mount said first elongated member and said second elongated member to the forward-looking faces of said pair of headlights;
   headlight vertical aim indicating means cooperatively associated with said first elongated member and said second elongated member being operable to indicate presence of said first elongated member in a horizontal plane and presence of said second elongated member in a horizontal plane;
   first headlight lateral aim indicating means on said first elongated member and cooperatively associated with said second elongated member being operable to indicate lateral alignment of said second elongated member relative to said first elongated member;
   second headlight lateral aim indicating means on said second elongated member and cooperatively associated with said first elongated member being operable to indicate lateral alignment of said first elongated member relative to said second elongated member;

said second elongated member has a first lateral aim mark thereon spaced from said mounting means a first distance;

said first headlight lateral aim indicating means includes a sight-line scope on said first elongated member and spaced from said mounting means a distance equal to said first distance for visual observation of said mark;

said first elongated member has a second lateral aim mark thereon spaced from said mounting means a second distance; and said second headlight lateral aim indicating means includes a sight-line scope on said second elongated member and spaced from said mounting means a distance equal to said second distance for visual observation of said second mark;

each slight-line scope includes a tube through which a person looks with each tube fixedly mounted to a separate one of said elongated members and extending generally perpendicularly thereto, said first elongated member has a distal end with a sight-line scope positioned thereat and with said second lateral aim mark located on said first elongated member but remotely from said distal end, said second elongated member has a second distal end with said first lateral aim mark positioned thereat and with a sight-line scope located on said second elongated member but remotely from said second distal end.

2. A device for use in aligning a headlight comprising:

an elongated rod-like main body having a proximal end and an opposite distal end portion with opposite sides and a longitudinal axis extending between said proximal end and said distal end, said main body includes a sight-line aperture and a lateral aim mark at said distal end portion, said lateral aim mark includes a projection extending radially into said sight-line aperture, said distal end portion including a passage extending horizontally through a fixed distance defining said aperture with said passage opening on opposite sides of said distal end portion, said projection being a ridge with a vertex projecting along the length of said passage and terminating at opposite sides of said distal end portion, said distal end portion further including a pair of vertically extending lines positioned on said opposite sides and extending in a direction through the vertex of said ridge;

a suction cup on said proximal end to mount said main body on the forward-looking face of a headlight to be aligned; and a pair of bubble levels on said main body and positioned one atop and one beneath said main body to indicate when said axis of said main body extends horizontally from said suction cup.

* * * * *